United States Patent
Miyoshi et al.

(10) Patent No.: US 7,648,289 B2
(45) Date of Patent: Jan. 19, 2010

(54) MODULE HAVING A HANDLE TO BE OPERATED TO ATTACH THE MODULE TO A CAGE

(75) Inventors: Makoto Miyoshi, Kawasaki (JP); Kazuya Sasaki, Kawasaki (JP); Akihiko Hayashi, Kawasaki (JP); Shinichi Aoki, Kawasaki (JP); Yasunori Nagakubo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/078,060

(22) Filed: Mar. 26, 2008

(65) Prior Publication Data

US 2008/0187271 A1    Aug. 7, 2008

Related U.S. Application Data

(63) Continuation of application No. PCT/JP2006/320662, filed on Oct. 17, 2006.

(30) Foreign Application Priority Data

Oct. 17, 2005    (JP) ............................. 2005-302386

(51) Int. Cl.
   *G02B 6/36*    (2006.01)
(52) U.S. Cl. .............................. 385/92; 385/76; 385/88; 385/139
(58) Field of Classification Search .................. None
See application file for complete search history.

(56) References Cited

U.S. PATENT DOCUMENTS

| 6,430,053 | B1 | 8/2002 | Peterson et al. | |
|---|---|---|---|---|
| 6,439,918 | B1 | 8/2002 | Togami et al. | |
| 6,746,158 | B2 * | 6/2004 | Merrick | 385/53 |
| 7,118,281 | B2 * | 10/2006 | Chiu et al. | 385/53 |
| 7,261,475 | B2 * | 8/2007 | Sasaki et al. | 385/92 |
| 2003/0142917 | A1 | 7/2003 | Merrick | |
| 2003/0198025 | A1 | 10/2003 | Cao | |
| 2003/0198026 | A1 | 10/2003 | Bui | |

(Continued)

FOREIGN PATENT DOCUMENTS

JP    2004-125860    4/2004

(Continued)

OTHER PUBLICATIONS

International Search Report (PCT/ISA/210) mailed Nov. 14, 2006 in connection with the International application PCT/JP2006/320662.

*Primary Examiner*—Michelle R Connelly Cushwa
(74) *Attorney, Agent, or Firm*—Fujitsu Patent Center

(57) ABSTRACT

A module is configured to be attached to a cage. A handle is rotatable about a rotation shaft between an accommodated position where the module is mounted to the cage and a withdrawal position where the module can be withdrawn from the cage. A resiliently-bendable tongue piece performs engagement and disengagement between the module and the cage. A notch portion is provided to the tongue piece. A press portion is provided to the handle on a circumference having a center located on the rotation shaft of the handle, the press portion configured to contact with the notch portion when the handle is at the accommodated position. A cam rotatable with the handle so as to resiliently bend the tongue piece.

6 Claims, 7 Drawing Sheets

U.S. PATENT DOCUMENTS

| | | |
|---|---|---|
| 2003/0228799 A1 | 12/2003 | Machado et al. |
| 2004/0062493 A1 | 4/2004 | Ishigami et al. |
| 2005/0141827 A1 | 6/2005 | Yamada et al. |
| 2005/0191013 A1 | 9/2005 | Sasaki et al. |
| 2005/0196109 A1 | 9/2005 | Kim et al. |

FOREIGN PATENT DOCUMENTS

| | | |
|---|---|---|
| JP | 2005-189684 | 7/2005 |
| JP | 2005-249892 | 9/2005 |
| WO | WO03/090322 A1 | 10/2003 |
| WO | WO2005/093482 A1 | 10/2005 |

* cited by examiner

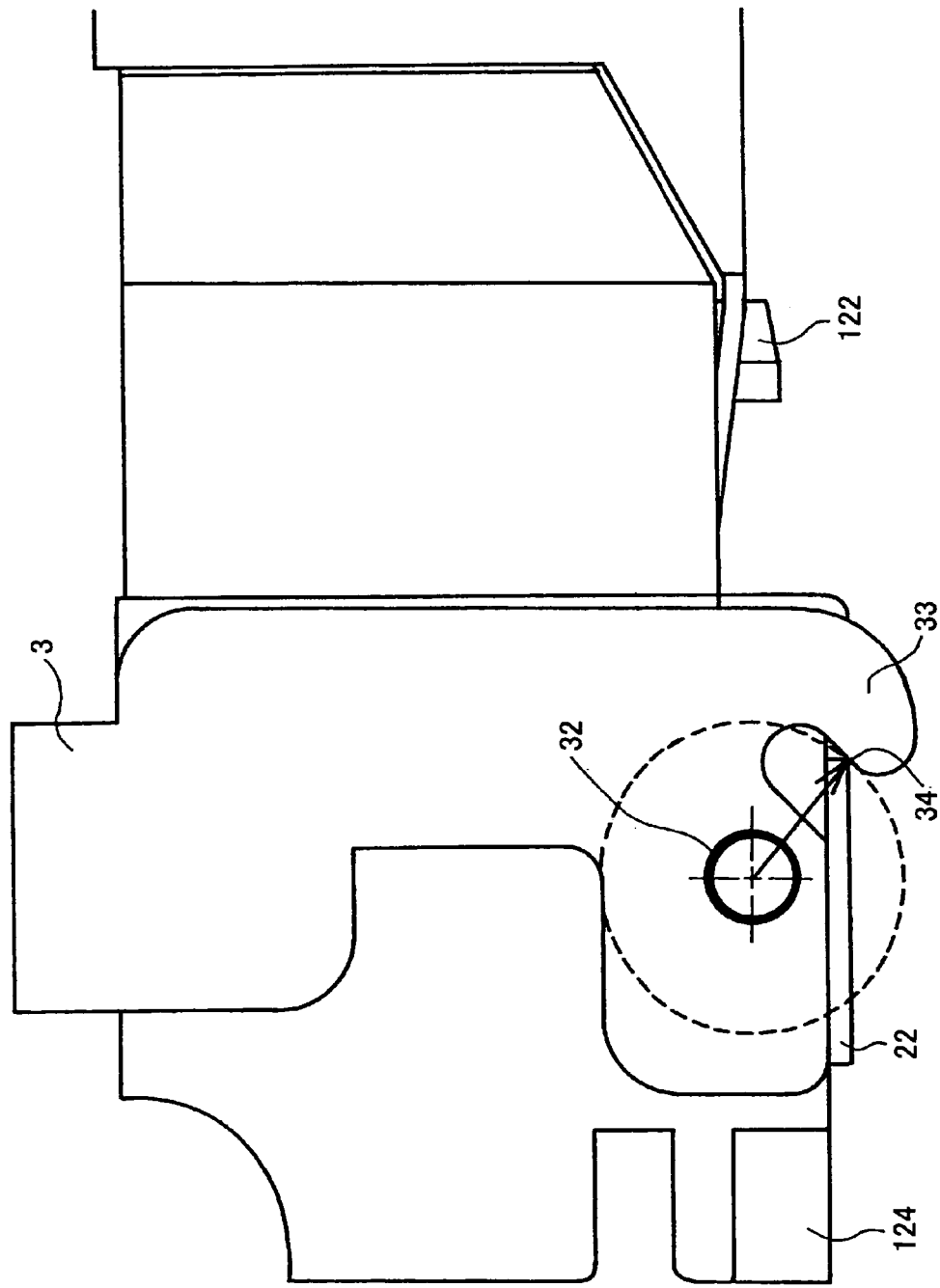

MODULE HAVING A HANDLE TO BE OPERATED TO ATTACH THE MODULE TO A CAGE

CROSS REFERENCE TO THE RELATED APPLICATIONS

This application is a U.S. continuation application, filed under 35 USC 111(a) and claiming the benefit under 35 USC 120 and 365(c), of PCT application JP2006/320662 filed Oct. 17, 2006, which is based on Japanese priority application No. 2005-302386 filed Oct. 17, 2005. The foregoing applications are hereby incorporated herein by reference.

BACKGROUND OF THE INVENTION

1. Field of the Invention

The present invention relates to a module structure of a communication device performing input and output of electric signals or optical signals and, more particularly, to an engagement structure between a module and a cage for accommodating the module.

2. Description of the Related Art

There is known a module structure in which a communication device performing input and output of electric signals or optical signals is modularized and the module can be inserted into and detached from a cage accommodating the module.

As a modularized communication device, there are, for example, an E/O module, which changes an electric signal into an optical signal to send it, and an O/E module, which changes an optical signal into an electrical signal to receive it.

In the field of an optical-communication equipment, which is oriented to minimization, standardization (multi-source) of the specification of structural elements has been progressed, and the standard (MSA: Multi Source Agreement) is defined with respect to a size of the module and the cage, a compatibility of a light/electricity interface part, a mechanical compatibility regarding mounting and demounting a module to a cage, etc.

As an insertion/detachment mechanism of a module to a cage, there is known a structure which disengages the module from the cage by causing the handle of the module to rotate from an accommodated position to a withdrawal position (for example, refer to Japanese Laid-Open Patent Application No. 2005-249892).

FIGS. 1A, 1B and 1C are perspective views showing an insertion/detachment mechanism of a conventional modularized optical communication apparatus.

FIG. 1A shows a state where a module 1 is accommodated in a cage 4, FIG. 1B shows a state where the module 1 is disengaged from the cage 4 by rotating a handle 3 of the module 1 from an accommodated position to a withdrawal position, and FIG. 1C shows a state where the module 1 is pulled out of the cage 4 by pulling the handle 3.

In FIG. 1A, the handle 3 is rotated in a direction of an arrow 50 by being supported by a connector fitting part 121 so as to be in an upstanding state. This position of the handle 3 is referred to as an accommodated position. In this state, an engagement pin 122 provided in a T-shaped tongue piece 21 of the module 1 protrudes from an engagement aperture 43 provided in an I-shaped tongue piece 42 of the cage 4, and, thereby, the module 1 is in engagement with the cage 4 and is in a restrained state.

As shown in FIG. 1B, when the handle 3 of the module 1 is rotated in a direction of an arrow 51, a plate cam 31 formed on an end of a rotation shaft 32 of the handle 3 rotates in a direction of an arrow 56 and the T-shaped tongue piece 21 is pressed down in a direction of an arrow 52. As a result of the I-shaped tongue piece 42 of the cage 4 being bent downward by following the movement, the engagement between the engagement pin 122 and the engagement aperture 43 is cancelled, and, thereby, the module 1 is released from restraint and falls into a withdrawal/detachable state.

In FIG. 1C, the T-shaped tongue piece 21 is maintained to be pressed down by drawing the module 1 in a direction of an arrow 53 by pulling the handle 3. On the other hand, the I-shaped tongue piece 42 returns in a direction of an arrow 54 by a resilient force after it is separated from the T-shaped tongue piece 21.

In the Multi Source Agreement (MSA) regarding modules, there is a specification with respect of a height direction of a module, which gives a limitation to a length of a handle provided to a module.

In FIG. 1B, since the handle 3 needs to rotate without interference with the connector fitting part 121, there is a limitation in shifting the rotation shaft 32 of the handle 3 to the engagement pin 122. A length of the T-shaped tongue piece 21, which links a cam action according to a rotation of the handle 3 to a disengagement action of the engagement pin 122 and the engagement aperture 43, must be longer than a predetermined value.

Since the length of the T-shaped tongue piece 22 cannot be shortened due to a limit according to the agreement of module (MSA), if the T-shaped tongue piece 22 is displaced minutely, the engagement state by the engagement pin 122 and the engagement aperture 43 becomes unstable.

Especially, in FIG. 1A, in a state where the handle 3 is at the accommodated position, since the engagement by the engagement pin 122 and the engagement aperture 43 is maintained mainly by the resilient force of the I-shaped tongue piece 42, if the T-shaped tongue piece 22 is displaced due to aged deterioration, the engagement state by the engagement pin 122 and the engagement aperture 43 becomes unstable.

SUMMARY OF THE INVENTION

It is a general object of the present invention to provide an improved and useful module in which the above-mentioned problems are eliminated.

A more specific object of the present invention is to provide a module that reliably performs engagement between a module and a cage even if a handle is at an accommodated position in a structure in which an engagement between the module and the cage is cancelled by a rotation of the handle.

In order to achieve the above-mentioned objects, there is provided according to one aspect of the present invention a module configured to be attached to a cage, comprising: a handle rotatable about a rotation shaft between an accommodated position where the module is mounted to the cage and a withdrawal position where the module can be withdrawn from the cage; a resiliently-bendable tongue piece configured to perform engagement and disengagement between the module and the cage; a notch portion provided to the tongue piece; a press portion provided to the handle on a circumference having a center located on the rotation shaft of the handle, the press portion configured to contact with the notch portion when the handle is at the accommodated position; and a cam rotatable with the handle so as to resiliently bend the tongue piece.

There is provided according to another aspect of the present invention a module configured to be attachable to and detachable from a cage, comprising: an engagement pin that engages the module with the cage by being inserted into an engagement aperture provided to the cage in a state where the module is attached to the cage; a tongue piece connected to said engagement pin and displaceable in a direction in which the engagement pin is disengaged from the engagement aperture; and a handle configured to limit a displacement of the tongue piece in a state where the module is attached to the cage and cancel the limitation of the tongue piece by rotating about a rotation shaft, the handle having a cam structure provided in a vicinity of the rotation shaft so as to urge the tongue piece, the handle being capable of urging the tongue piece until an engagement between the cage and the module due to an insertion of the engagement pin into the engagement aperture is cancelled.

According to the module of the present invention, the tongue piece can be surely held only when the handle is at the accommodated position because the notch is provided to the tongue piece that performs disengagement of the module from the cage, and the press part, which contacts with the notch, is provided to the handle on a circumference having a center on the rotation shaft of the handle, and the cam structure is provided in the vicinity of the rotation shaft of the handle.

BRIEF DESCRIPTION OF THE DRAWINGS

FIG. 5 is a side view of the handle together with the housing tongue piece showing a relationship between a press part, a contact part and a rotation shaft.

DETAILED DESCRIPTION OF THE PREFERRED EMBODIMENTS

A description will be given below, with reference to the drawings, of an embodiment of the present invention.

Figure 1A:
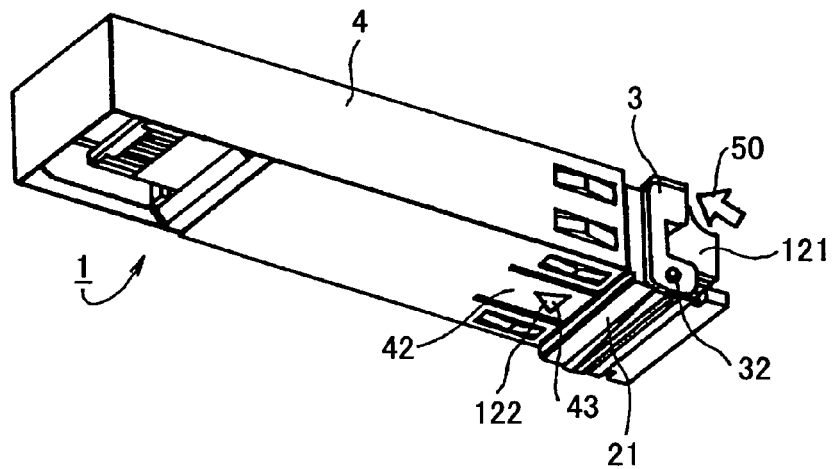
FIG. 1A is a perspective view showing a state where a module is accommodated in a cage.
Figure 1B:
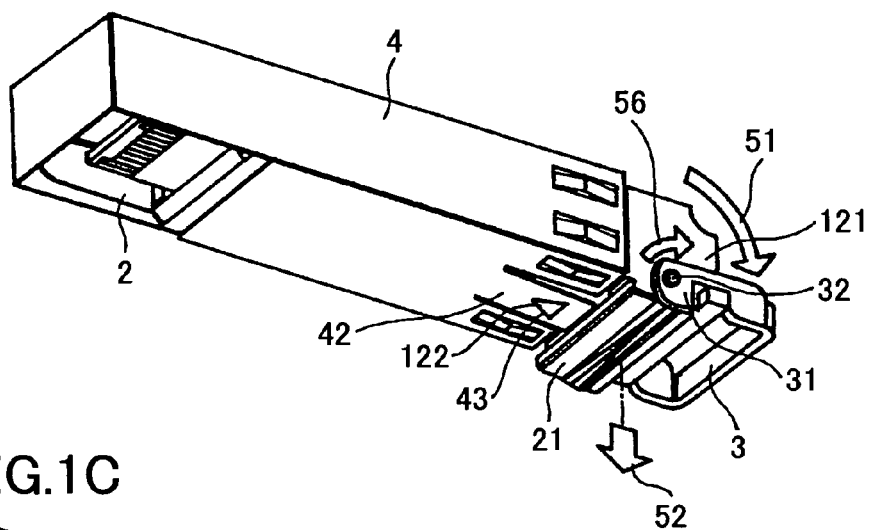
FIG. 1B is a perspective view showing a state where the module is disengaged from the cage.
Figure 1C:
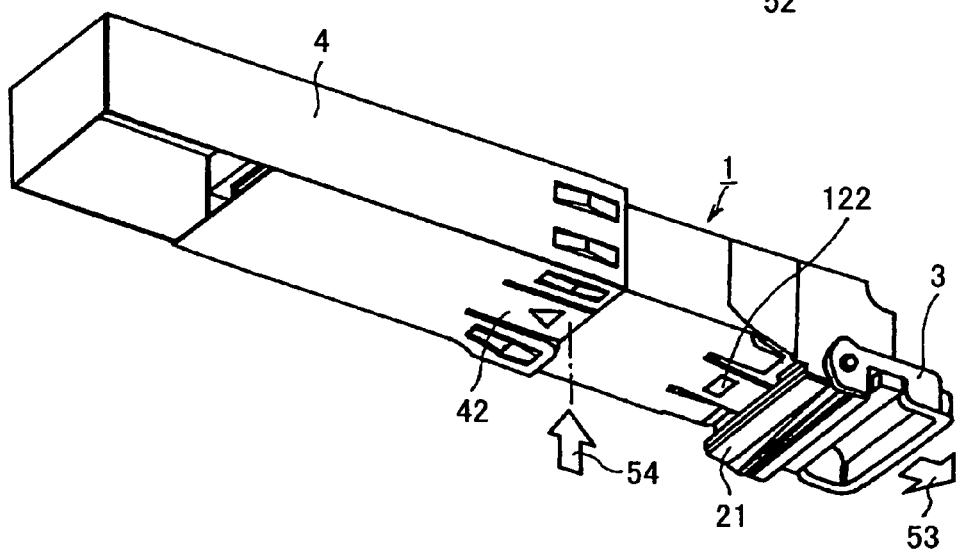
FIG. 1C is a perspective view showing a state where the module is pulled out of the cage 4.
Figure 2A:
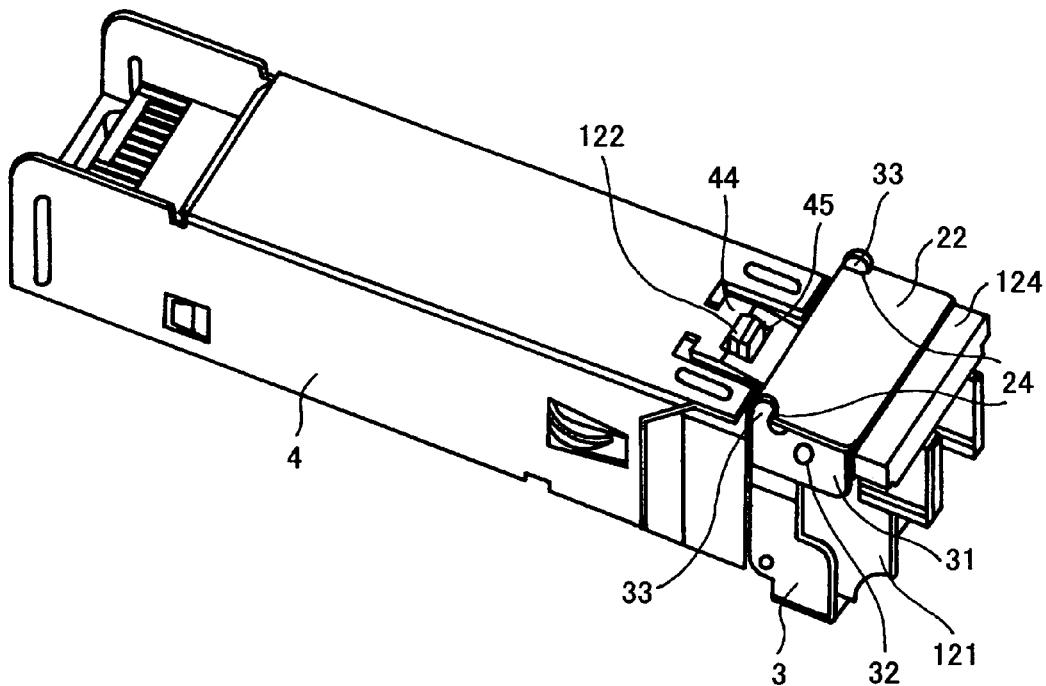
FIG. 2A is a perspective view showing a cage and an optical module according to an embodiment of the present invention in a state where a handle is accommodated and the cage and the module are engaged with each other.
Figure 2B:
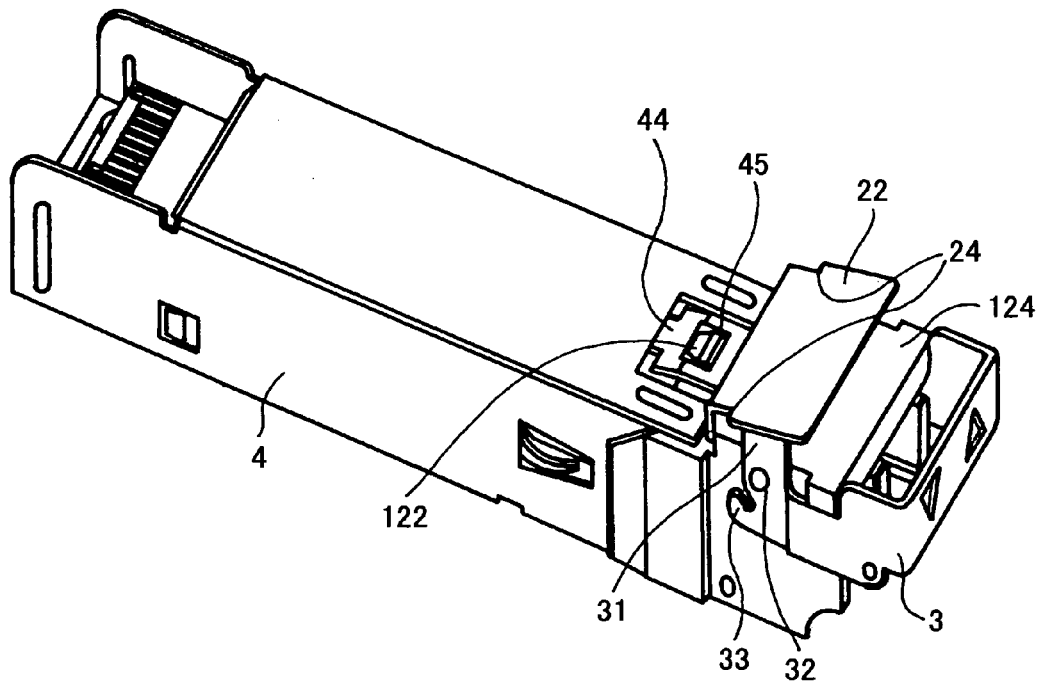
FIG. 2B is a perspective view showing a state where the engagement between the cage and the module is cancelled.

An optical module according to an embodiment of the present invention is shown in FIGS. 2A and 2B. FIG. 2A shows a state where the handle 3 is accommodated and the cage 4 and the module 1 are engaged with each other. FIG. 2B shows a state where the cage 4 and the module 1 are disengaged from each other.

In FIG. 2A, the cage 4 has a cage tongue piece 44, which is displaceable in an elevation angle and has an engagement aperture 45. Additionally, the module 1 has the engagement pin 122 as an engagement portion protruding from the module 1. The module 1 and the cage 4 fall into an engagement state by the engagement pin 122 being inserted into a clear aperture 23 of the housing tongue piece 22 and the engagement aperture 45 of the cage 4. The housing tongue piece 22 is in contact with the plate cam 31. The handle 3 has press portions 33 at a position opposite to the plate cam 31 with the rotation shaft therebetween. A description of the press portion 33 will be given later.

If the handle 3 is rotated and set in a state shown in FIG. 2B, the plate cam 31 is operated so as to urge the housing tongue piece 22 in the direction of the elevation angle. As a result, the cage tongue piece 44 follows the movement of the housing tongue piece 22 and is urged in the direction of the elevation angle. Thus, the engagement pin 122 is released from the clear aperture 23 and the engagement aperture 45 and, thereby, the module 1 can be pulled out and removed from the cage 4. It should be noted that the rotation of the handle 3 is limited so that the handle 3 does not rotate beyond a stopper 124 of the connector fitting part 121.

Figure 3A:
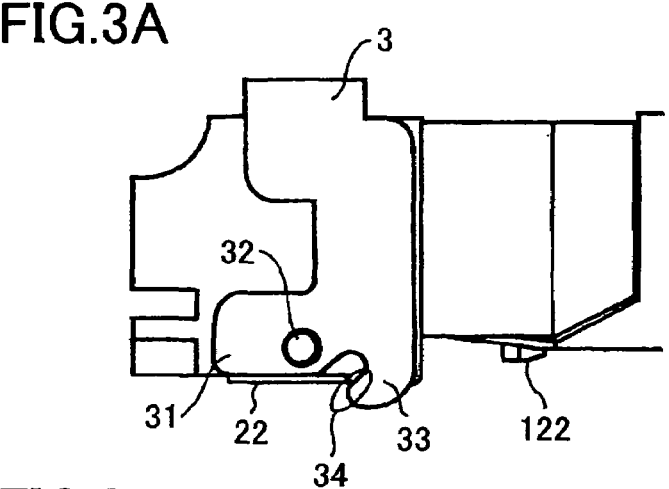
FIG. 3A is a side view where the handle is at an accommodated state.
Figure 3D:
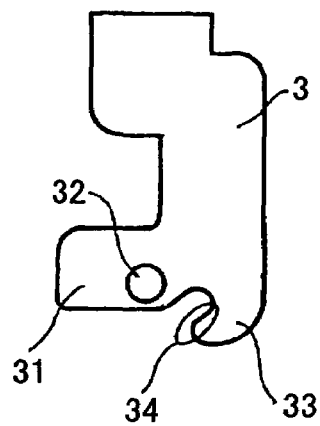
FIG. 3D is a side view of the handle.
Figure 3B:
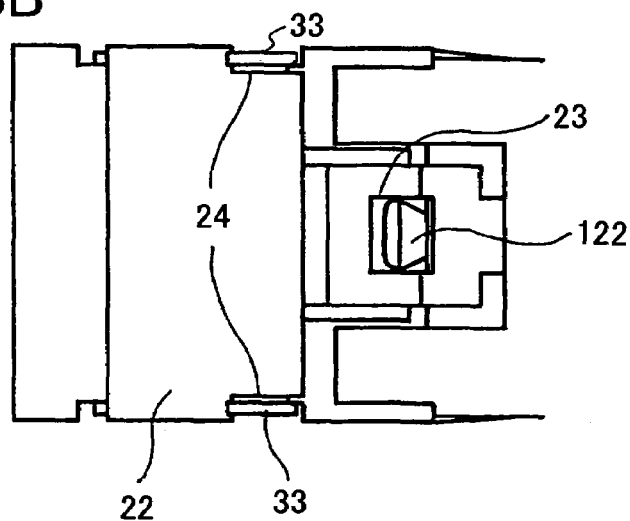
FIG. 3B is a bottom view where the housing tongue piece is attached to the module 1 together with the handle.
Figure 3C:
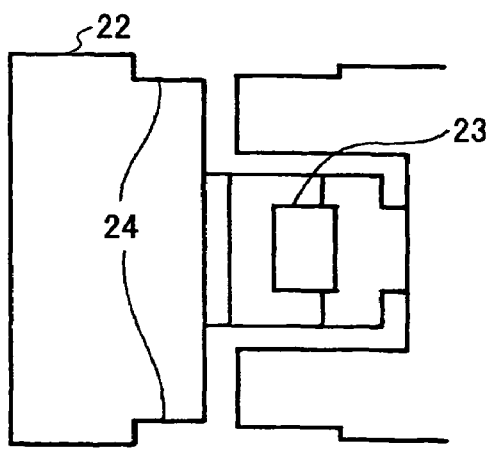
FIG. 3C is a bottom view of the housing tongue piece.

FIGS. 3A through 3D show the cage 4 and parts related to the engagement of the module 1. FIG. 3A is a side view where the handle 3 is at the accommodated position. FIG. 3B is a bottom view where the housing tongue piece 22 is attached to the module 1 together with the handle 3. FIG. 3C is a bottom view of the housing tongue piece 22. FIG. 3D is a side view of the handle 3.

In FIG. 3A, the handle 3 is at the accommodated position and the housing tongue piece 22 is not urged by the plate cam 31 in the direction of the elevation angle. However, the handle 3 receives a force in notch portions 24 in a longitudinal direction from the press portions 33, that is a leftward direction of FIG. 3A.

Referring to FIG. 3B, the housing tongue piece 22 has a clear aperture 23 into which the engagement pin 122 of the module 1 is inserted. The housing tongue piece 22 also has the notch portions 24 that contact with the respective press portions 33 at contact portions 34, respectively. The notch portions 24 receive a force in a longitudinal direction.

Each notch portion 24 is at a position and has a size so that it does not interfere with the respective press portion 33 when the handle 3 rotates and it receives a force from the respective contact portion 34 in a longitudinal direction in a state where the handle 3 is accommodated.

Referring to FIG. 3C, the housing tongue piece 22 has the clear aperture 23 formed therein. When the housing tongue piece 22 is not displaced in the direction of the elevation angle, the engagement pin 122 is inserted into the clear aperture 23 and the engagement aperture 45 so as to engage the module 1 with the cage 4. On the other hand, when the housing tongue piece 22 is displaced in the direction of the elevation angle, the housing tongue piece 22 urges the cage tongue piece 44. Thus, the engagement pin 122 is released from the clear aperture 23 and the engagement aperture 45.

Referring to FIG. 3D, the press portion 33 is configured so that it does not interfere with an inner wall of the handle 3 when the handle 3 rotates, and it contacts with the housing tongue piece 22 only at the contact portion 34.

A description will now be given, with reference to FIGS. 4A through 4D, of operations of the housing tongue piece 22 and the handle 3.

Figure 4A:
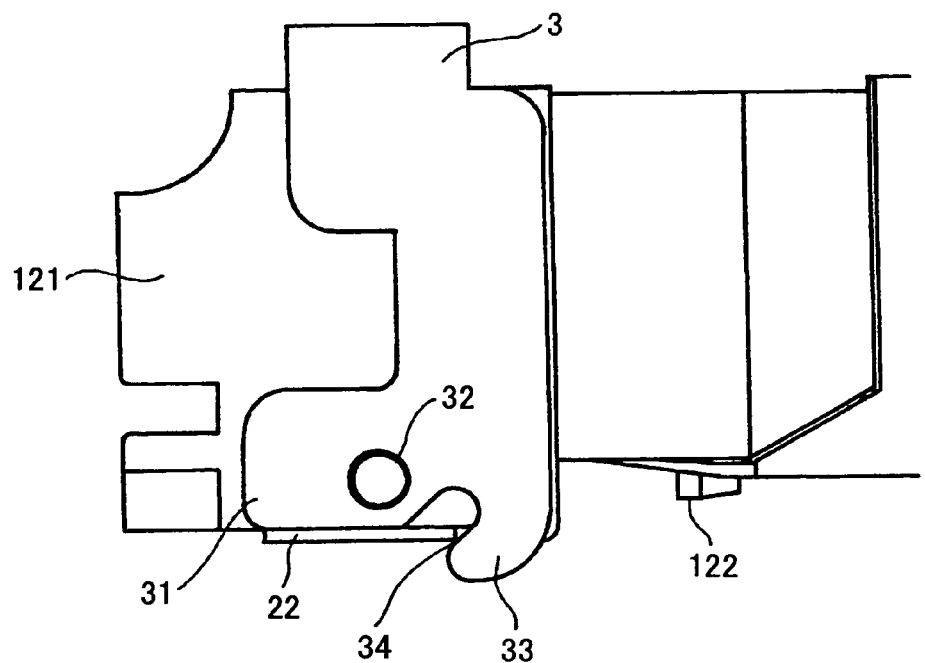
FIG. 4A is a side view of the housing tongue piece the handle where the handle is at the accommodated state.
Figure 4B:
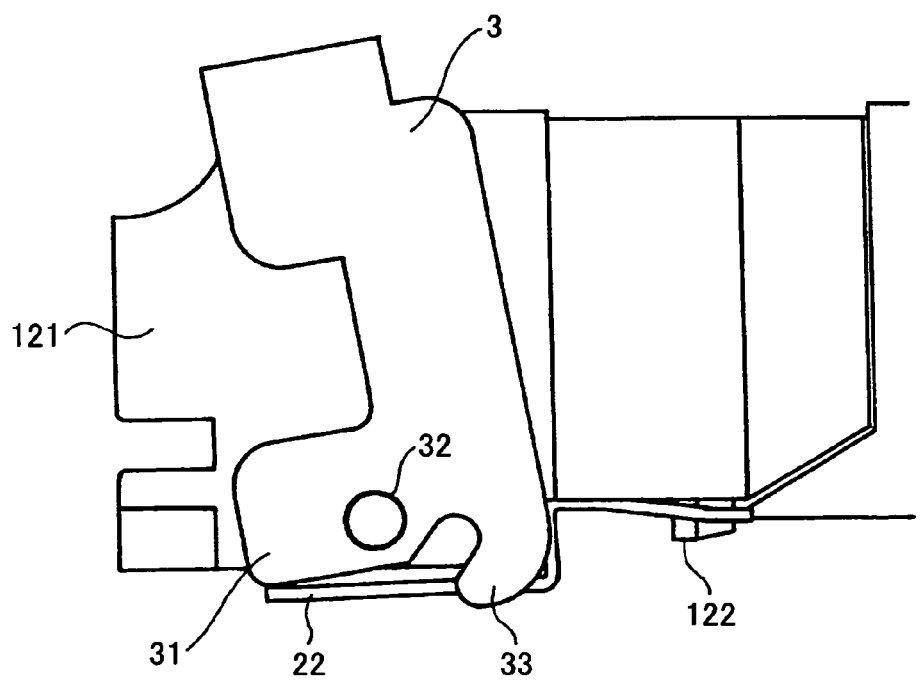
FIG. 4B is a side view of the housing tongue piece and the handle where the handle is rotated slightly.
Figure 4C:
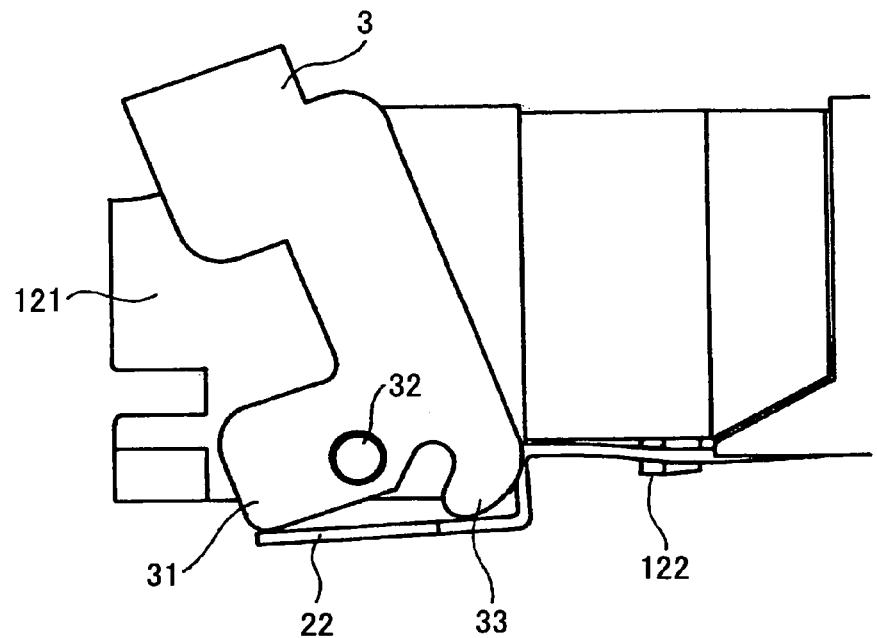
FIG. 4C is a side view of the housing tongue piece and the handle where the handle is rotated further.
Figure 4D:
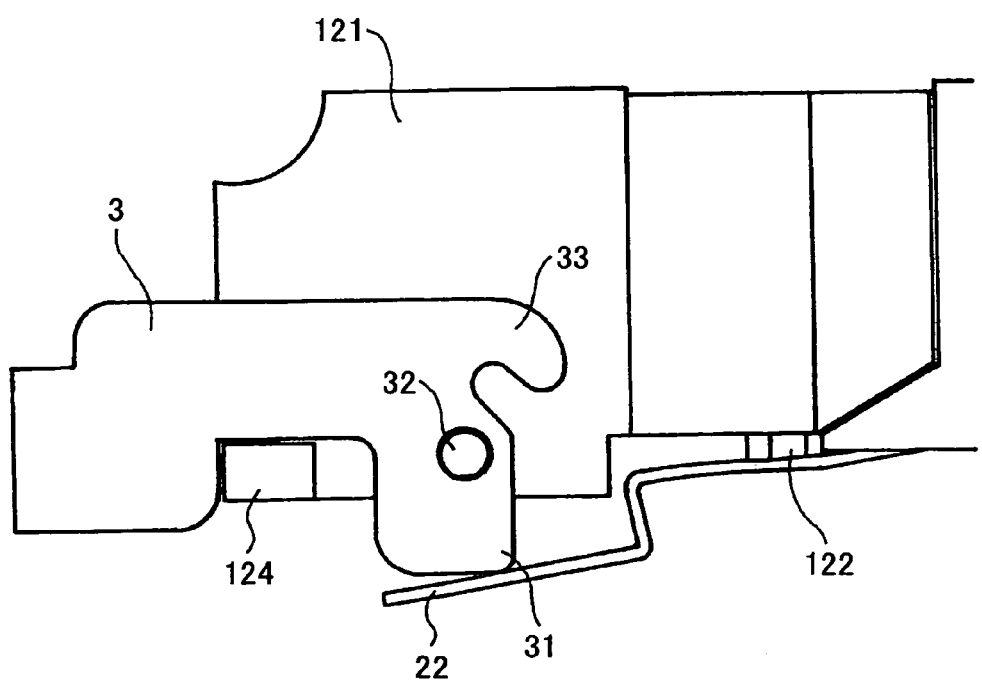
FIG. 4D is a side view of the housing tongue piece and the handle where the handle is rotated completely.

FIG. 4A is a side view of the housing tongue piece 22 and the handle 3 where the handle 3 is at the accommodated position. FIG. 4B is a side view of the housing tongue piece 22 and the handle 3 where the handle 3 is rotated slightly. FIG. 4C is a side view of the housing tongue piece 22 and the handle 3 where the handle 3 is rotated further. FIG. 4D is a side view of the housing tongue piece 22 and the handle 3 where the handle 3 is rotated completely. Additionally, FIG. 5 is a side view of the handle 3 together with the housing tongue piece 22 showing a relationship between the press portion 33, the contact portion 34 and the rotation shaft 32;

When the handle 3 is at the accommodated position as shown in FIG. 4A, the housing tongue piece 22 is not urged in the direction of the elevation angle, but it receives a force by the press portion 33 at the notch portion 24 in the leftward in FIG. 4A. In the state where the handle 3 is not rotated, the displacement of the housing tongue piece 22 in the direction of the elevation angle of the cage tongue piece 44 is limited by the press portion 33 of the handle 3.

Here, the contact portion 34 is formed on a circumference having a center on the rotation shaft 32. Also a contact point between the handle 3 and the notch portion 24 of the housing tongue piece 22 is on the circumference on which the contact portion 34 is formed.

When the handle 3 is rotated by a small angle as shown in FIG. 4B, the press portion 33 rotates about the rotation shaft 32 as a center of the rotation. Because the housing tongue piece 22 is displaced by the plate cam 31 in the direction of the elevation angle, the notch portion 24 of the housing tongue piece 22 and the press portion 33 of the contact portion 34 are separated from each other, which eliminates a limitation of the housing tongue piece 22 by the press portion 33.

That is, because the cancellation of the limitation by the press portion 33 and the urge of the housing tongue piece 22 by the plate cam 31 occur simultaneously by the rotation of the handle 3, the housing tongue piece 22 and the handle 3 do not contact and press each other.

As shown in FIG. 4C, when the handle 3 is rotated further from the state shown in FIG. 4B, the press portion 33 is separated completely from the housing tongue piece 22, and the engagement pin 122 is slightly removed from the clear aperture 23 and the engagement aperture 43.

As shown in FIG. 4D, when the handle 3 is rotated by 90 degrees and stopped by the stopper 124, the engagement pin 122 is disengaged from the clear aperture 23 and the engagement aperture 43. Thus, the module 1 is disengaged from the cage 4 and the module 1 is in a removable state.

Figure 6:
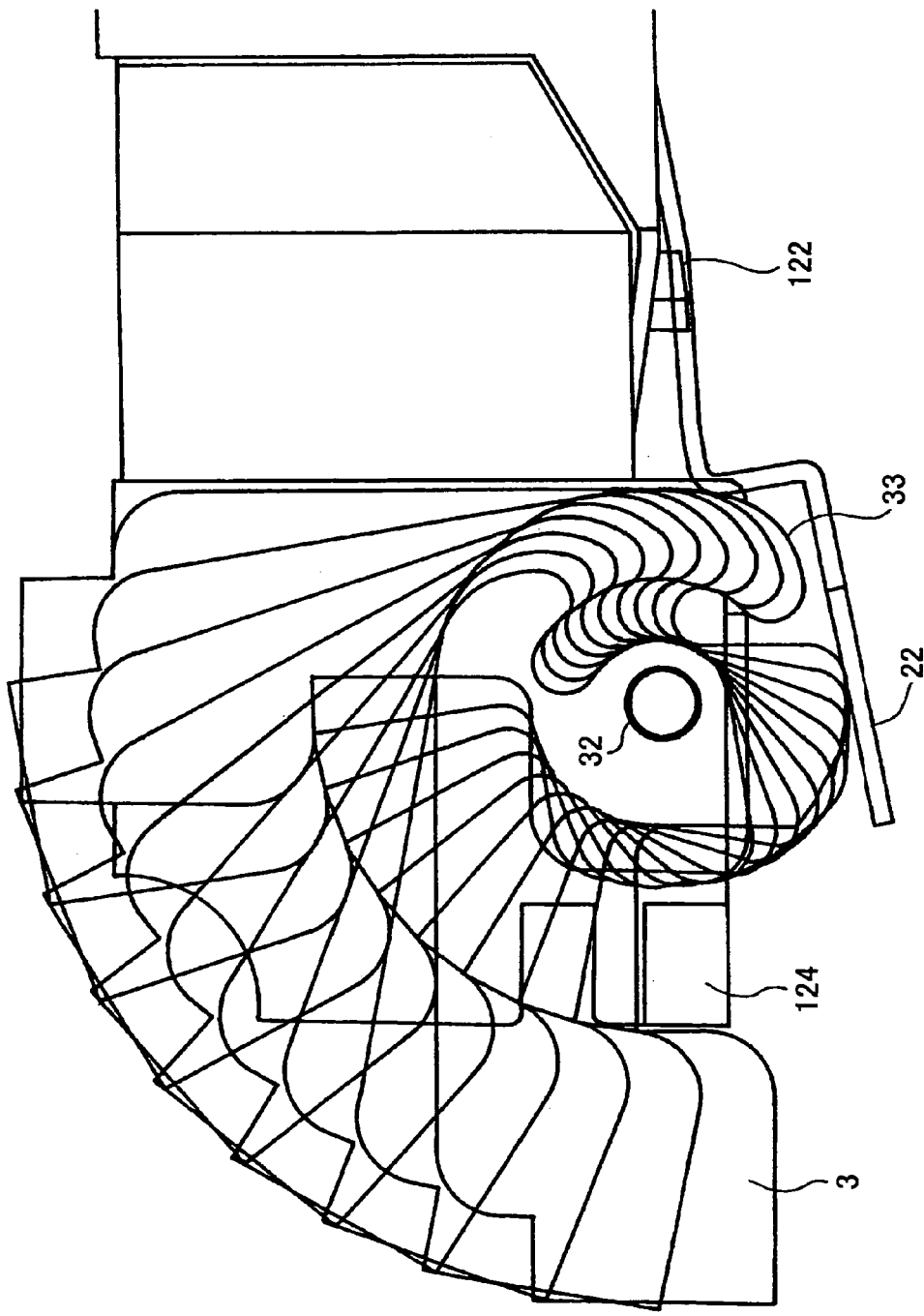
FIG. 6 is a side view of the handle and the housing tongue piece showing the rotation of the handle in sequential motion.

FIG. 6 is a side view of the handle 3 and the housing tongue piece 22 showing the rotation of the handle 3 in sequential motion. As explained above, the contact portion 34 is formed on the circumference having center located on the rotation shaft 32, and the rotation of the press portion 33 and the urging by the plate cam 31 occur simultaneously while the handle 3 is rotating. Thus, the housing tongue piece 22 and the handle 3 do not contact and press against each other.

As mentioned above, in the optical module according to the embodiment of the present invention, the housing tongue piece 22 can be surely held only when the handle 3 is at the accommodated position because the notch 24 is provided to the housing tongue piece 22 that performs disengagement of the module 1 from the cage 4, and the press portion 33, which contacts with the notch portion 24, is provided on a circumference having a center located on the rotation shaft 32 of the handle 3, and the cam structure is provided in the vicinity of the rotation shaft 32 of the handle 3.

It should be noted that the housing tongue piece 22 and the cage tongue piece 44 are not limited to an integrated structure to give elasticity, and there may be many variations in the configuration of the tongue pieces.

Additionally, there may be many variations of the engagement pin 122 and the engagement aperture 45 since any engagement relationship can be used if the engagement pin 122 and the engagement aperture 45 can fit and engaged with each other.

The present application is based on Japanese priority application No. 2005-302386 filed Oct. 17, 2005, the entire contents of which are hereby incorporated herein by reference.

What is claimed is:

1. A module configured to be attached to a cage, comprising:
   a handle rotatable about a rotation shaft between an accommodated position where the module is mounted to the cage and a withdrawal position where the module can be withdrawn;
   a resilient tongue piece configured to perform engagement and disengagement between the module and the cage, the tongue piece being configured with a notch arrangement; and
   a cam rotatable with the handle so as to deflect the tongue piece,
   wherein the handle is configured with a press portion to contact an edge surface of the notch arrangement when the handle is disposed in the accommodated position; and
   wherein the press portion extends from a front side of the tongue piece on which the handle is disposed to a backside of the tongue piece opposite to the front side by passing through the notch arrangement so as to engage with the edge surface of the notch arrangement so as to inhibit displacement of the tongue piece.

2. The module as claimed in claim 1, wherein the cam and the press portion are configured and arranged so that when the handle is rotated from the accommodated position toward the withdrawal position, the cam deflects the tongue piece and the press portion disengages from the tongue piece.

3. The module as claimed in claim 2, wherein the cam and the press portion are integrally formed with the handle.

4. The module as claimed in claim 1, further comprising:
   an engagement portion configured to engage with the cage, wherein the engagement portion protrudes from the module in a direction corresponding to the direction the tongue piece is being deflected by the cam.

5. The module as claimed in claim 4, wherein the engagement portion is a pin protruding from the module.

6. A module configured to be attachable to and detachable from a cage being configured with an aperture, comprising:
   an engagement pin that engages the module with the cage by being inserted into the aperture in a state where the module is attached to the cage;
   a tongue piece connected to the engagement pin and displaceable in a disengagement direction for disengaging the engagement pin from the aperture; and
   a handle configured to inhibit displacement of the tongue piece in the disengagement direction in a state where the module is attached to the cage, the handle having a cam structure provided in a vicinity of the rotation shaft to apply force to the tongue piece to deflect the tongue piece so that the engagement pin is removed from the aperture,
   wherein the handle is configured with a press portion to contact an edge of the tongue piece in the state where the module is attached to the cage; and
   wherein the press portion extends from a front side of the tongue piece on which the handle is disposed to a backside of the tongue piece opposite to the front side so as to engage with the edge of the tongue piece so as to inhibit displacement of the tongue piece.

* * * * *